| United States Patent [19] | [11] Patent Number: 4,794,161 |
|---|---|
| Kato et al. | [45] Date of Patent: Dec. 27, 1988 |

[54] PROCESS FOR PRODUCING A POLYARYLENE SULFIDE WITH CONTROLLED RATIO OF ALKALI METAL SULFIDE TO WATER

[75] Inventors: Toshikazu Kato; Hiroshi Inoue, both of Shinnanyo; Noriaki Emura, Tokuyama, all of Japan

[73] Assignees: Tosoh Corporation; Hodogaya Chemical Co., Ltd., both of Japan

[21] Appl. No.: 943,009

[22] Filed: Dec. 18, 1986

[30] Foreign Application Priority Data

Dec. 18, 1985 [JP] Japan ................................ 60-283017

[51] Int. Cl.$^4$ ............................................. C08G 75/16
[52] U.S. Cl. .................................................... 528/388
[58] Field of Search ........................................ 528/388

[56] References Cited

U.S. PATENT DOCUMENTS

| 3,354,129 | 11/1967 | Edmonds et al. | 260/79 |
|---|---|---|---|
| 4,495,332 | 1/1985 | Shiiki et al. | 528/388 |
| 4,663,430 | 5/1987 | Ostlinning et al. | 528/388 |

FOREIGN PATENT DOCUMENTS 763994 7/1967 Canada .
140272A 5/1985 European Pat. Off. .

Primary Examiner—Harold D. Anderson
Attorney, Agent, or Firm—Sughrue, Mion, Zinn, Macpeak, and Seas

[57] ABSTRACT

A polyarylene sulfide having a low content of heavy metals and excellent heat stability is produced by mixing an alkali metal sulfide, water, and an organic polar solvent in the molar ratio of about 1:10 to 20:1 to 10 and by heating the mixture to remove water and then polymerizing the resulting mixture with a polyhalogenated aromatic compound. Such a polyarylene sulfide is very useful for use in electronic components and automotive parts, etc.

3 Claims, No Drawings

PROCESS FOR PRODUCING A POLYARYLENE SULFIDE WITH CONTROLLED RATIO OF ALKALI METAL SULFIDE TO WATER

BACKGROUND OF THE INVENTION

1. Field of the Invention

This invention relates to a process for producing a polyarylene sulfide (for example, a polyphenylene sulfide) having a low content of heavy metals, excellent electrical characteristics, and excellent heat stability.

Polyarylene sulfide, having excellent heat resistance and excellent chemical resistance, has attracted special attention for use in electronic components and automotive parts. Being moldable into engineering parts made of plastics, films, sheets, fibers, etc., polyarylene sulfide is widely used in fields where heat resistance is needed.

2. Description of the Prior Art

Japanese Patent Publication No. 3368/1970 discloses a process for producing polyarylene sulfide wherein the reaction between p-dichlorobenzene and sodium sulfide is conducted in an organic polar solvent such as N-methyl-2-pyrrolidone or the like. Sodium sulfide containing 2.8 moles or 9 moles of water of hydration per mole of $Na_2S$ is heated to free the water of hydration under reduced pressure or in N-methyl-2-pyrrolidone solvent with the introduction of bubbles of nitrogen and then p-dichlorobenzene is added thereto, followed by thermal polymerization.

This process, however, causes thee corrosion of reaction vessels made of iron or stainless steel, because highly corrosive sodium sulfide is maintained at high temperatures in the dehydration stage, resulting in elution of heavy metals such as iron or the like into sodium sulfide. Therefore, a significant amount of heavy metals remains in the polymer produced by the reaction with p-dichlorobenzene, which unfavorably causes a reduction in heat stability and electrical characteristics. It is also conceivable to use titanium, chromium, molybdenum, or tungsten, or stainless steels having a high content of these metals, as the constituent materials of a reaction vessel in order to prevent heavy metals remaining in the polymer. However, these materials are undesirable because of their low reliability at high temperatures and pressure and their high cost.

SUMMARY OF THE INVENTION

It is therefore an object of the present invention to provide a process for producing a polyarylene sulfide having a low content of heavy metals, excellent electrical characteristics, and excellent heat stability even when a reaction vessel, which is made of low cost materials, such as stainless steel having high reliability at high temperature and pressure is used.

Other objects and advantages of the present invention will become apparent to those skilled in the art from the following description and disclosure.

DETAILED DESCRIPTION OF THE PREFERRED EMBODIMENT

The present invention relates to a process for producing a polyarylene sulfide, which comprises mixing an alkali metal sulfide, water and an organic polar solvent in the ratio of about 1:10 to 20:1 to 10 (molar ratio) and by heating the mixture at a temperature of from an initial point of about 100° C. to an end point of about 180°-230° C. to remove water, the molar ratio of the alkali sulfide to water thereby being in the range of about 1:0.9 to 2.0, and then thermally polymerizing the resulting mixture with about 0.90 to about 1.1 moles of polyhalogenated aromatic compound per mole of the alkali metal sulfide at a temperature of from about 180° to about 300° C.

When the water of hydration is removed from a highly corrosive alkali metal sulfide by heating it in a mixture which includes a large excess of water and an organic polar solvent, the highly corrosive alkali metal sulfide at low temperature may be converted to a reaction mixture comprising an extremely low corrosive alkali metal sulfide, water and the organic polar solvent, which causes barely any corrosion of the reaction vessel in the subsequent dehydration at high temperature.

Alkali metal sulfides usable in the present invention include lithium sulfide, sodium sulfide, potassium sulfide, and mixtures thereof. An alkali metal hydrosulfide and an alkali metal hydroxide may be mixed to produce an alkali metal sulfide in situ.

Moreover, a small amount of alkali metal hydroxide may be added to react with a trace amount of the alkali metal hydrosulfide and alkali metal thiosulfate which are contained in the alkali metal sulfide.

The water referred to in the present invention is the total sum of water present in the reaction system, including the water of hydration of the alkali metal sulfide and the water produced by the reaction between an alkali metal hydrosulfide and an alkali metal hydroxide. Moreover, 10 to 20 moles of water per mole of alkali metal sulfide should be added to the system of reaction prior to the removal of water by heating. Less than 10 moles of water unfavorably leads to a larger proportion of heavy metals being contained in the resulting polymer. More than 20 moles of water requires more energy to remove water, which is undesirable from the economic viewpoint.

Preferable organic polar solvents usable in the present invention are aprotic polar solvents which are stable at high temperatures. Examples of them include amides and ureas such as N,N-dimethylacetamide, N-ethyl-2-pyrrolidone, N-methyl-2-pyrrolidone, hexamethylphosphoramide, tetramethylurea, 1,3-dimethyl-2-imidazolidinone or the like, sulfones such as sulfolane, dimethyl sulfolane or the like, ketones such as methyl phenyl ketone or the like, and mixtures thereof.

The amount of the solvents used should be in the range of 1 to 10 moles per mole of alkali metal sulfide. Less than one mole of the solvent unfavorably leads to a larger proportion of heavy metals in the resulting polymer. More than 10 moles of the solvent is undesirable from the economic viewpoint.

Polyhalogenated aromatic compounds usable in the present invention are halogenated aromatic compounds in which two or more halogen atoms are bonded directly to the aromatic nucleus. Examples of them include p-dichlorobenzene, o-dichlorobenzene, m-dichlorobenzene, dibromobenzene, diiodobenzene, trichlorobenzene, tribromobenzene, triiodobenzene, tetrachlorobenzene, tetrabromobenzene, tetraiodobenzene, dichloronaphthalene, dibromonaphthalene, diiodonaphthalene, dichlorobiphenyl, dibromobiphenyl, diiodobiphenyl, dichlorodiphenyl sulfone, dibromodiphenyl sulfone, diiododiphenyl sulfone, dichlorobenzophenone, dibromobenzophenone, diiodobenzophenone, dichlorodiphenyl ether, dibromodiphenyl ether, dicnlorodiphenyl sulfide, dibromodiphenyl sulfide or the like, and mixtures thereof p-Dichlorobenzene and a mixture of p-dichlorobenzene and a small amount of trichlorobenzene are usually used.

The amount of the polyhalogenated aromatic compound used is usually in the range of about 0.90 to about 1.1 moles per mole of an alkali metal sulfide. Deviation from this range unfavorably caused the polymer to possess a reduced molecular weight.

An auxiliary catalyst such as organic alkali metal carboxylate may also be added to produce a polymer having a higher molecular weight.

The removal of water by heating in the present invention is usually conducted at a temperature of from an initial point of about 100° C. to an end point of about 180°–230° C. When the temperature is higher than 230° C., a significant amount of organic polar solvent is undesirably removed together with water by heating.

The preferable molar ratio relative to water of the alkali metal sulfide after the removal of water is normally in the range of 1:0.9 to 2.0.

Polymerization in the present invention is conducted ordinarily at 180° to 300° C., preferable 200° to 270° C., for 0.5 to 20 hours with stirring. When the polymerization temperature is lower than 180° C., the polymerization rate is considerably reduced. When the polymerization temperature is higher than 300° C., the thermal decomposition of the polymer may take place.

The polyarylene sulfide obtained according to the present invention can be subjected, in heat-treated or untreated conditions, as it is, or after being mixed with a reinforcing filler (e.g. glass fiber), a known inorganic filler (e.g. mica, talc, or silica), a pigment, a flameretardant, a stabilizer, or other polymers, to injection molding, extrusion molding, etc. to prepare a shapad article, a film, a sheet, a pipe, a fiber, etc.

EXAMPLES

The present invention will be explained more specifically below by way of Examples. However, the present invention is in no way restricted to these Examples.

The content of iron in the polymers shown in the Examples and Comparative Examples was measured by (a) subjecting about 0.5 g of a sample to wet decomposition with about 10 ml of sulfuric acid and about 10 ml of nitric acid in a quartz beaker, (b) adding thereto deionized water to prepare a solution of a predetermined amount and then (c) subjecting the solution to atomic absorption spectrometry.

The heat stability of the polymers was determined by visual inspection of the color of polymers when heat-treated for 2 hours at 250° C.

Example 1

In a SUS 316, 15-liter autoclave were placed 14.8 moles of $Na_2S.2.8H_2O$, 121 moles of water, and 44 moles of N-methyl-2-pyrrolidone. They were heated to 210° C. with stirring, whereby 2630 g of a distillate consisting mainly of water was removed. Then, the system was cooled to 170° C. and 14.8 moles of p-dichlorobenzene was added. The system was heated to 250° C. Polymerization was conducted for 3 hours at that temperature. After the completion of the polymerization, heating was conducted under reduced pressure to remove the solvent, and the resulting polymer was washed with hot water three times, subjected to repeated centrifuging, and then dried overnight by heating to give a lightwhite powder. The yield, iron content, and heat stability of the polymers were measured. The results are shown in Table 1.

Example 2

The procedure of Example 1 was repeated except that 151 moles of water were added. The results are shown in Table 1.

Example 3

The procedure of Example 1 was repeated except that 14.8 moles of NaSH (25% aqueous solution) and 14.8 moles of NaOH (48% aqueous solution) were added instead of $Na_2S.2.8H_2O$ and no further water was added. The results are shown in Table 1.

Example 4

The procedure of Example 1 was repeated except that 14.73 moles of p-dichlorobenzene and 0.07 mole of 1,2,4-trichlorobenzene were added. The results are shown in Table 1.

Comparative Example 1

The procedure of Example 1 was repeated except that no water was added. The results are shown in Table 1.

Comparative Example 2

The procedure of Example 1 was repeated except that 14.8 moles of $Na_2S.9H_2O$ were added instead of $Na_2S.2.8H_2O$ and no water was added. The results are shown in Table 1.

Example 5

The procedure of Example 1 was repeated except that 16.28 moles of N-methyl-2-pyrrolidone were added prior to the removal of water and then p-dichlorobenzene was added together with 27.72 moles of N-methyl-2-pyrrolidone to conduct polymerization. The results are shown in Table 1.

Comparative Example 3

The procedure of Example 1 was repeated except that 13.32 moles of N-methyl-2-pyrrolidone were added prior to the removal of water and then p-dichlorobenzene was added together with 30.68 moles of N-methyl-2-pyrrolidone to conduct polymerization. The results are shown in Table 1.

TABLE 1

|  | Compositions before the removal of water | | Compositions after the removal of water | Yield of the polymer (%) | Contents of iron (ppm) | Heat stability (Color) |
|---|---|---|---|---|---|---|
|  | $H_2O/Na_2S$ (Molar ratio) | $NMP/Na_2S$ (Molar ratio) | $H_2O/Na_2S$ (Molar ratio) |  |  |  |
| Example 1 | 11 | 3.0 | 1.2 | 96 | 29 | Light-yellow |
| Example 2 | 13 | 3.0 | 1.0 | 96 | <10 | Light-yellow |
| Example 3 | 12.5 | 3.0 | 1.1 | 96 | 21 | Light-yellow |
| Example 4 | 11 | 3.0 | 1.1 | 96 | 35 | Light-yellow |
| Example 5 | 11 | 1.1 | 1.2 | 95 | 48 | Light-yellow |

TABLE 1-continued

|  | Compositions before the removal of water | | Compositions after the removal of water | Yield of the polymer (%) | Contents of iron (ppm) | Heat stability (Color) |
|---|---|---|---|---|---|---|
|  | $H_2O/Na_2S$ (Molar ratio) | $NMP/Na_2S$ (Molar ratio) | $H_2O/Na_2S$ (Molar ratio) |  |  |  |
| Comp. Ex. 1 | 2.8 | 3.0 | 1.1 | 95 | 850 | Brown |
| Comp. Ex. 2 | 9.0 | 3.0 | 1.1 | 95 | 380 | Brown |
| Comp. Ex. 3 | 11 | 0.9 | 1.0 | 92 | 1100 | Brown |

NMP: N—methyl-2-pyrrolidone

Examples 1 to 4 and Comparative Examples 1 to 2 apparently show that a molar ratio of $H_2O/Na_2S$ of more than 10 before the removal of water gives an extremely low content of iron as compared with those having a molar ratio of less than 10, and further a relatively small degree of discoloration and indicating excellent heat stability after the application of heat.

Example 5 and Comparative Example 3 show that a molar ratio of N-methyl-2-pyrrolidone/$Na_2S$ of less than 1.0 before the removal of water gives an extremely high content of iron even when additional N-methyl-2-pyrrolidone was added prior to polymerization, resulting in reduced heat stability. Therefore, the molar ratio of N-methyl-2-pyrrolidone/$Na_2S$ before the removal of water needs to be 1.0 or more.

As is obvious from the above explanation, the present invention provides a polyarylene sulfide having a low content of heavy metals and excellent heat stability.

What is claimed is:

1. A process for producing a polyarylene sulfide, which comprises mixing an alkali metal sulfide, water and an organic polar solvent in a molar ratio of about 1:(10 to 20):(1 to 10) and by heating the resultant mixture at an initial temperature of about 100° C. and a final temperature of of about 180° to 200° C. to reduce the water content of the mixture so that the molar ratio of the alkali sulfide to water in said mixture is in the range of about 1:0.9 to 2.0, and then adding about 0.90 to about 1.1 moles of a polyhalogenated aromatic compound per mole of alkali metal sulfide, and thermally polymerizing the resultant mixture at a temperature of from about 80° to 300° C.

2. The process according to claim 1 wherein the thermal polymerization is conducted at a temperature of from 200° to 270° C.

3. The process according to claim 1 wherein the auxiliary catalyst is further added to the thermal polymerization.

* * * * *